Sept. 15, 1953      E. F. W. ALEXANDERSON      2,652,529
PHASE BALANCING SYSTEM
Filed Sept. 17, 1952

Inventor:
Ernst F.W.Alexanderson,
by Harry R. Mayers
His Attorney.

Patented Sept. 15, 1953

2,652,529

UNITED STATES PATENT OFFICE 2,652,529

PHASE BALANCING SYSTEM

Ernst F. W. Alexanderson, Schenectady, N. Y., assignor to General Electric Company, a corporation of New York Application September 17, 1952, Serial No. 310,073

18 Claims. (Cl. 323—101)

1

My invention relates to phase balancing systems and, more particularly, to an arrangement for maintaining a substantially balanced load condition in a polyphase system to which is connected a variable single phase load.

If a single phase load is connected to one phase of a polyphase power system there will be a tendency for the system load to be unbalanced. A capacitive reactance, an inductive reactance and a single phase load can be energized from different phase conductors of a three phase system and by suitable choice of components, a balanced condition can be established. Such a condition in known arrangements can not persist if the magnitude of the single phase load changes appreciably.

It is an object of my invention to provide a control system for use in conjunction with a load balancing arrangement for a three phase power system to one phase of which is connected a variable single phase load.

It is a further object of my invention to provide an automatic load balancing system which is adapted to maintain balanced load conditions in a three phase system to which is connected one or more variable single phase loads.

It is a still further object of my invention to provide an arrangement for automatically transferring power from one phase of a three phase system to another in response to variations in the load applied to one or more phases of the three phase system.

In accordance with the invention capacitive reactance means and inductive reactance means such as a non-linear reactor are energized from different phases of a polyphase source of electric energy and are arranged so that for balanced conditions no net or resultant leading and lagging currents are respectively drawn from the system by the capacitive and inductive reactances. As an unbalanced condition of the polyphase source develops, due to unbalanced loading, for example, control means responsive to the unbalanced condition causes the capacitive reactance means to draw leading current from one phase of the system and also causes the inductive reactance means to draw lagging current from another phase. A resultant current representing the vector sum of these two currents is then in effect supplied to the load or other cause of unbalance so as to produce a balanced load distribution on the polyphase source.

The novel features which I believe to be characteristic of my invention are set forth with particularity in the appended claims. My invention

Figure 1:
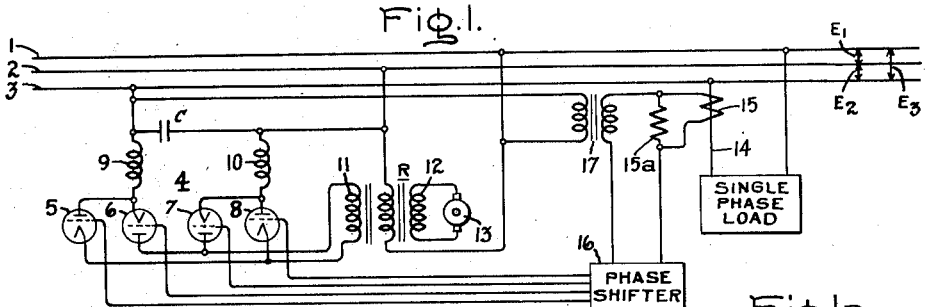
Figures 1A, 2:
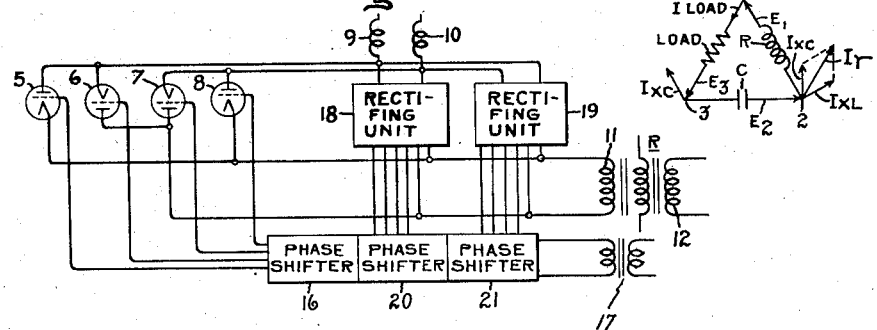
Figure 3:
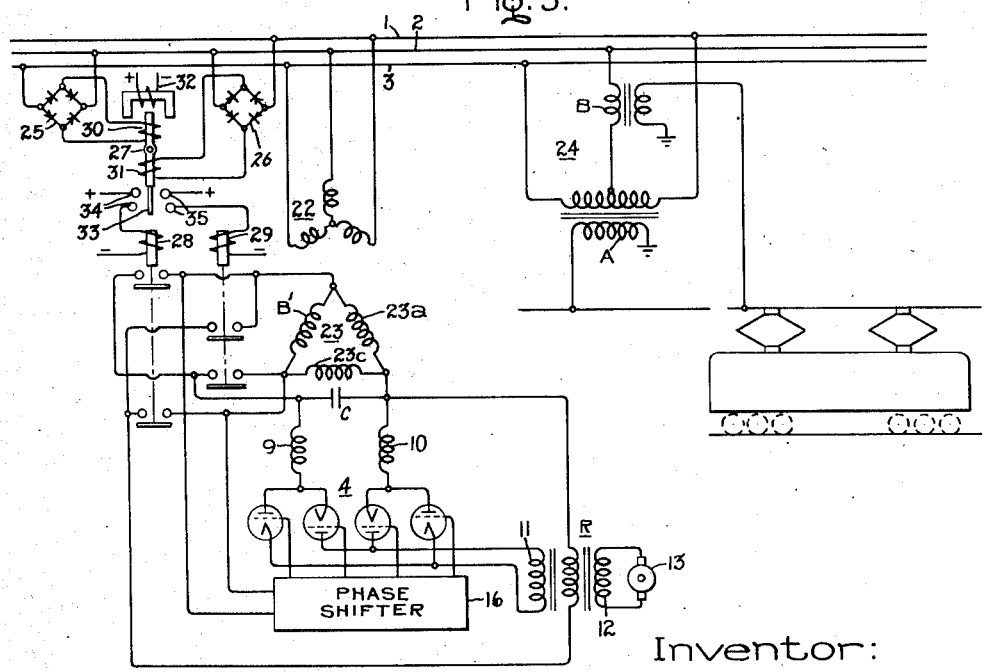

2 itself, however, both as to its organization and method of operation, together with further objects and advantages thereof may best be understood by reference to the following description taken in connection with the accompanying drawing in which Fig. 1 thereof is a circuit diagram illustrating schematically a phase balancer applied to a three phase source of energy in accordance with my invention; Fig. 1a is a vector diagram to aid in understanding the principles of the invention; Fig. 2 is a modification of Fig. 1 and illustrates a particular application of my invention operable over wider ranges of phase unbalance than the arrangement of Fig. 1; and in which Fig. 3 represents schematically an alternative arrangement utilizing the principles of the invention.

In the arrangement of Fig. 1, power is drawn by the single phase load, indicated schematically, from lines 1 and 3 tending to cause unbalanced loading of the three phase source comprising lines 1, 2 and 3. To compensate for this unbalanced loading, capacitance means C and inductance means R are respectively connected across conductors 2 and 3 and across conductors 1 and 2 of the three phase system. To provide control of the magnitudes of reactance of elements C and R continuously and for varied loading conditions, means including an electronic equipment 4 may be employed. The electronic equipment 4 functions as a variable reactance circuit which regulates the capacitive reactance of the capacitor C in response to variations in the load. The reactor R is of the type in which the inductive reactance thereof can be varied by a saturating current which may be derived from the electronic equipment 4. Thus, by controlling the operation of the electronic equipment 4 in response to load variations, the effective capacitance and inductance of elements C and R may be varied to maintain proper balancing of the various phases of the power supply.

The electronic equipment or reactive control means 4 comprises gaseous discharge rectifier elements 5—8 arranged in a bridge circuit with the capacitor C connected by means of reactors 9 and 10 to one diagonal of the bridge, and with control winding 11 connected across the other diagonal thereof. The tubes 5—8 are arranged to provide full wave rectification of the alternating voltage impressed across capacitor C from lines 2 and 3 of the power source.

Winding 11 comprises a saturating control winding for reactor R and is connected in series with the direct current output circuit of the electronic equipment 4 for controlling the reactance of inductive reactor R. Reactor R is provided with another saturating control winding 12 which affords a constant degree of presaturation and is energized by a direct current exciter 13 or any other suitable direct current source. The constant saturating current in winding 12 and the variable saturating current in winding 11 produce opposing control effects on the reactance of reactor R. Preferably, the constant and variable saturating currents are adjusted so that for zero load on conductors 1 and 3 the net resulting control effect is zero and the current through winding 11 is equal to the maximum rectified current that can be delivered by the electronic equipment 4. This maximum current of the electronic equipment 4 in flowing through reactors 9 and 10 is also preferably of such magnitude and phase as to neutralize the current of the capacitor C. Since this condition obtains for zero load in the single phase line 14, no power could be transferred from one phase to the other because current in reactor R, and net current in capacitor C and reactors 9 and 10, are substantially zero.

When a single phase load such as is indicated is applied to transmission line 14 loading of the polyphase system will tend to be unbalanced and will cause a control signal to be supplied to the control electrodes of tubes 5—8 for controlling the conduction of these tubes in accordance with the magnitude of the single phase load. This signal may be supplied by a current transformer 15 which derives a signal which varies in accordance with variations in the current drawn by single phase line 14. The control signal is then applied to a phase shifting circuit 16 which operates to control conduction of tubes 5—8 in accordance with the magnitude of the current in line 14. Circuit 16 comprises any well-known arrangement for varying the phase of the grid signals of tubes 5—8 with respect to the alternating plate voltage. The control signal can also be obtained from the voltage changes across lines 1 and 3 caused by load 1 or may be obtained from a combination of these two arrangements. Fig. 1 shows this combination wherein an additional signal depending on the voltage existing across phase conductors 1 and 3 is supplied through potential transformer 17 to the input of phase shifter 16 in addition to the signal derived by current transformer 15. Thus when the load draws current, the phase shifter 16 operates in response to current and voltage signals from transformers 15 and 17 respectively to reduce the current passing through tubes 5—8 to a corresponding degree thereby to reduce the variable saturating current in control winding 11. This allows the constant presaturating current supplied to control winding 12 to increase the saturation of reactor R thereby decreasing its reactance and increasing its lagging current. Reduced current through tubes 5—8 and through reactors 9 and 10 renders capacitor C effective to draw leading current. The net leading current in capacitor C and the lagging current in reactor R respectively drawn from the phases comprising conductors 1 and 2 and conductors 2 and 3 appears as a resultant energy current which is supplied to the phase comprising conductors 1 and 3 to which the single phase load is connected. Thus reactor R and capacitor C are effective to cause an interchange of energy between the phases so as to maintain balanced conditions. This interchange of energy is represented for one condition in Fig. 1a wherein vector rotation is counterclockwise with the current $I_{xc}$ leading the voltage $E_2$ by ninety degrees and with the current $I_{xL}$ lagging the voltage $E_1$ by ninety degrees. The resultant current $I_r$ of these two quadrative currents has an energy component relative to the load voltage $E_3$.

The electronic equipment has been shown in its simplest form to comprise four rectifying tubes 5—8 connected as a single phase, full wave rectifier arranged to control both reactor R and capacitor C. In order to reduce the generation of harmonics in the electronic equipment, it may be desirable to employ several additional groups of rectifying units such as 18 and 19, similar to the unit comprising tubes 5—8, as shown in Fig. 2 so that the several groups can be fired at different phase relations relative to the power supply by means of the adjustable phase shifting circuits 16, 20 and 21. In Fig. 3 the reactors 9, 10, and R, the transformer 17, and the presaturating winding 12 are connected as in Fig. 1.

In the embodiment of the invention as shown in Fig. 3, the phase balancing circuit comprises a step-down transformer for connecting the capacitor C and reactor R to the three phase system. The transformer is provided with a Y-connected primary 22 and a delta connected secondary 23 so as to short circuit the third harmonic. The load is supplied by a Scott connected transformer 24.

The reactor R and capacitor C and electronic equipment 4 are employed in a manner similar to that described in connection with Fig. 1 above. The control signal applied to the phase shifter preferably should be derived from the voltage across winding B' of the delta transformer winding 23. If there is an excess amount of power drawn from phase B by the single phase load schematically represented as an electric locomotive, the electronic balancer operates in the manner described in connection with Fig. 1 to take current from the other two phases in the delta connected secondary winding 23 and deliver it to phase B' of the delta winding and in turn to phase B of transformer 24.

If the engine moves along its track toward the left its load is transferred from phase B to phase A. Such a shift in the load makes it necessary to interchange the connections of capacitor C and reactor R. To this end rectifiers 25 and 26, polarized relay 27, and auxiliary relays 28 and 29 are used, rectifier 25 being energized from lines 2 and 3 and rectifier 26 being energized from lines 1 and 2. Polarized relay 27 is provided with a pair of coils 30 and 31 which are respectively energized by rectifiers 25 and 26. The magnitude of voltage supplied to coils 30 and 31, together with the action of polarizing coil 32, determines whether the contact 33 engages the contacts 34 or the contacts 35 which respectively control the relays 28 and 29. Thus if relay 29 is operated, reactor R and capacitor C will be connected across winding 23a and 23c respectively. If, on the other hand, the voltages between lines 1 and 2 and between lines 2 and 3 are such as to cause contacts 34 to be closed, then relay 28 will operate and will cause the reactor R and capacitor C to interchange connections so as to establish balanced conditions.

In view of the above description of the invention, it will be understood that in accordance with the invention, smooth balanced conditions may be maintained in a polyphase system wherein the loading is such as to tend to unbalance the system.

While I have shown certain embodiments of my invention by way of illustration, many modifications will occur to those skilled in the art and I therefore intend in the appended claims to cover all such modifications as fall within the true spirit and scope of my invention.

What I claim as new and desire to secure by Letters Patent of the United States is:

1. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, and means responsive to unbalanced loading of the polyphase system for controlling the magnitude of current through said rectifier circuit.

2. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the biasing action of said bias winding being substantially equal to the magnetizing action of said control winding when the current in said control winding is substantially equal to the maximum current that said rectifier circuit is capable of delivering, and means responsive to unbalanced loading of the polyphase system for controlling the magnitude of current through said rectifier circuit.

3. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the maximum current which said rectifier circuit is capable of delivering being substantially equal to the current required to neutralize the current in said capacitor, and means responsive to unbalanced loading of the polyphase system for controlling the magnitude of current through said rectifier circuit.

4. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the biasing action of said bias winding being substantially equal to the magnetizing action of said control winding when the current in said control winding is substantially equal to the maximum current that said rectifier circuit is capable of delivering, the maximum current which said rectifier circuit is capable of delivering being substantially equal to the current required to neutralize the current in said capacitor, and means responsive to unbalanced loading of the polyphase system for controlling the magnitude of current through said rectifier circuit.

5. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, means responsive to unbalanced loading of the polyphase system for controlling the magnitude of current through said rectifier circuit, and means responsive to an unbalanced load on the system for interchanging the connections of said reactor and of said capacitor.

6. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the biasing action of said bias winding being substantially equal to the magnetizing action of said control winding when the current in said control winding is substantially equal to the maximum current that said rectifier circuit is capable of delivering, means responsive to unbalanced loading of the polyphase system for controlling the magnitude of current through said rectifier circuit, and means responsive to an unbalanced load on the system for interchanging the connection of said reactor and of said capacitor.

7. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the maximum current which said rectifier circuit is capable of delivering being substantially equal to the current required to neutralize the current in said capacitor, means responsive to unbalanced loading of the polyphase system for controlling the magnitude of current through said rectifier circuit, and means responsive to an unbalanced load on the system for interchanging the connections of said reactor and of said capacitor.

8. In combination, a non-linear reactor and a capacitor arranged to be energized from different phases of a polyphase system, a bias winding for said non-linear reactor energized with direct current of substantially constant magnitude, a control winding for said non-linear reactor, the magnetizing action of said control winding being in opposition to the magnetizing action of said bias winding, a rectifier circuit energized with alternating current from the terminals of said capacitor and connected to supply direct current to said control winding, the biasing action of said bias winding being substantially equal to the magnetizing action of said control winding when the current in said control winding is substantially equal to the maximum current that said rectifier circuit is capable of delivering, the maximum current which said rectifier circuit is capable of delivering being substantially equal to the current required to neutralize the current in said capacitor, means responsive to unbalanced loading of the polyphase system for controlling the magnitude of current through said rectifier circuit, and means responsive to an unbalanced load on the system for interchanging the connections of said reactor and of said capacitor.

9. An arrangement for maintaining substantially balanced loading of a polyphase source of electric energy comprising capacitive reactance means energized from one phase of the polyphase source, inductive reactance means energized from another phase of the polyphase source, and means responsive to variations in a quantity which varies as a function of a load energized from still another phase of the polyphase source for controlling the effective reactance of said capacitive reactance means and of said inductive reactance means.

10. An arrangement for maintaining substantially balanced loading of a polyphase source of electric energy comprising capacitive reactance means energized by a quantity which is representative of one phase of the polyphase source, inductive reactance means energized by a quantity which is representative of another phase of the polyphase source, and means responsive to variations in a quantity which is indicative of changes in the loading of still another phase of the polyphase source for controlling the effective reactance of said capacitive reactance means and of said inductive reactance means.

11. An arrangement for maintaining substantially balanced loading of a polyphase source of electric energy comprising capacitive reactance means energized from one phase of the polyphase source, inductive reactance means energized from another phase of the polyphase source, and means responsive to variations in a quantity which varies as a function of a load energized from still another phase of the polyphase source for increasing the leading and lagging current drawn respectively by said capacitive reactance means and by said inductive reactance means in response to an increase in the magnitude of said load.

12. An arrangement for maintaining substantially balanced loading of a polyphase source of electric energy comprising capacitive reactance means energized from one phase of the polyphase source, inductive reactance means energized from another phase of the polyphase source, and means responsive to variations in a quantity which varies as a function of a load energized from still another phase of the polyphase source for decreasing the leading and lagging current respectively drawn by said capacitive reactance means and by said inductive reactance means in response to a decrease in the magnitude of said load.

13. An arrangement for maintaining substantially balanced loading of a polyphase source of electric energy comprising capacitive reactance means energized from one phase of the polyphase source, inductive reactance means energized from another phase of the polyphase source, reactive control means arranged in parallel with said capacitive reactance means for controlling the effective capacitance of said capacitive reactance means, and means responsive to variations in load applied to still another phase of the polyphase source for controlling the effective reactance of said inductive reactance means and of said reactive control means.

14. An arrangement for maintaining substantially balanced loading of a polyphase source of electric energy comprising capacitive reactance means energized from one phase of the polyphase source, inductive reactance means energized from another phase of the polyphase source, reactive control means arranged in parallel with said capacitive reactance means for controlling the effective capacitance of said capacitive reactance means, a control winding for said inductive reactance means, said winding being in series with said reactive control means, and means responsive to variations in load applied to still another phase of the polyphase source for controlling the flow of current through said reactive control means and through said control winding.

15. An arrangement for maintaining substantially balanced loading of a polyphase source of electric energy comprising capacitive reactance means energized from one phase of the polyphase source, inductive reactance means energized from another phase of the polyphase source, electronic means in parallel with said capacitive reactance means for controlling the effective capacitance of said capacitive reactance means, a control winding for said inductive reactance means, said winding being in series with said electronic means, a biasing winding for said inductive reactance means, said biasing winding being arranged so that the biasing effect thereof is in opposition to the magnetomotive force of said control winding, and means responsive to an increase in load on still another phase of the polyphase source for decreasing the flow of current through said electronic means and through said control winding.

16. An arrangement for maintaining substantially balanced loading of a polyphase source of electric energy comprising capacitive reactance means energized from one phase of the polyphase source, inductive reactance means energized from another phase of the polyphase source, electronic means in parallel with said capacitive reactance means for controlling the effective capacitance of said capacitive reactance means, a control winding for said inductive reactance means, said winding being in series with said electronic means, a biasing winding for said inductive reactance means, said biasing winding being arranged so that the biaising effect thereof is in opposition to the magnetomotive force of said control winding, the current through said control winding and said electronic device being of such magnitude for zero load on still another phase of the polyphase source that the bias of said control winding is substantially equal to the bias of said biasing winding and so that the capacitive reactance of said capacitive reactance means is substantially offset by the inductive reactance of said electronic means, and means responsive to an increase in load on said another phase of the polyphase source for decreasing the flow of current through said electronic means and through said control winding.

17. An arrangement for maintaining substantially balanced loading of a polyphase source of electric energy comprising capacitive reactance means energized from one phase of the polyphase source, inductive reactance means energized from another phase of the polyphase source, and means responsive to variations in a quantity which varies as a function of the voltage across still another phase of the polyphase source to which a single phase load is connected for controlling the effective reactance of said capacitive reactance means and of said inductive reactance means.

18. An arrangement for maintaining substantially balanced loading of a polyphase source of electric energy comprising capacitive reactance means energized from one phase of the polyphase source, inductive reactance means energized from another phase of the polyphase source, and means responsive to variations in a quantity which varies as a function of a load energized from still another phase of the polyphase source and of the voltage across said another phase for controlling the effective reactance of said capacitive reactance means and of said inductive reactance means.

ERNST F. W. ALEXANDERSON.

No references cited.